(12) United States Patent
Rothschild et al.

(10) Patent No.: US 9,154,847 B2
(45) Date of Patent: Oct. 6, 2015

(54) CREATING CLIENT-BASED PLAYLISTS WITH SCHEDULING FUNCTIONALITY

(75) Inventors: Keith Alan Rothschild, Dunwoody, GA (US); Rachel Snow, Marietta, GA (US); Frank Dwornicki, Marietta, GA (US)

(73) Assignee: Cox Communications, Inc., Atlanta, GA (US)

( * ) Notice: Subject to any disclaimer, the term of this patent is extended or adjusted under 35 U.S.C. 154(b) by 296 days.

(21) Appl. No.: 13/079,899

(22) Filed: Apr. 5, 2011

(65) Prior Publication Data

US 2012/0260286 A1    Oct. 11, 2012

(51) Int. Cl.
*H04N 5/445* (2011.01)
*H04N 21/482* (2011.01)
*H04N 21/462* (2011.01)

(52) U.S. Cl.
CPC ....... *H04N 21/4825* (2013.01); *H04N 21/4622* (2013.01)

(58) Field of Classification Search
CPC ............ H04N 21/482; H04N 21/4622; H04N 21/4394
USPC ............ 725/18, 37, 39, 45, 52, 62, 74, 80, 81
See application file for complete search history.

(56) References Cited

U.S. PATENT DOCUMENTS

2006/0248557 A1* 11/2006 Stark et al. ................. 725/37
2006/0267995 A1* 11/2006 Radloff et al. ............. 345/530

* cited by examiner

*Primary Examiner* — Jivka Rabovianski
(74) *Attorney, Agent, or Firm* — Merchant & Gould P.C.

(57) ABSTRACT

Content scheduling may be provided. First, a media guide may be displayed. Next, a plurality of asset selection input data respectively corresponding to a plurality of assets selected from the displayed media guide may be received. Then the plurality of asset selection input data may be stored in a playlist database. The playlist database may then be executed.

20 Claims, 3 Drawing Sheets

CREATING CLIENT-BASED PLAYLISTS WITH SCHEDULING FUNCTIONALITY

BACKGROUND

As music storage and playback using personal computers became common, the term "playlist" has been adopted by various media player software programs intended to organize and control music or video on a computer. Such playlists may be defined, stored, and selected to run either in sequence or, if a random playlist function is selected, in a random order. Playlists' uses include allowing a particular desired musical or video atmosphere to be created and maintained without constant user interaction, or to allow a variety of different styles of music and video to be played without maintenance.

SUMMARY

Content scheduling may be provided. First, a media guide may be displayed. Next, a plurality of asset selection input data respectively corresponding to a plurality of assets selected from the displayed media guide may be received. Then the plurality of asset selection input data may be stored in a playlist database. The playlist database may then be executed.

Both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
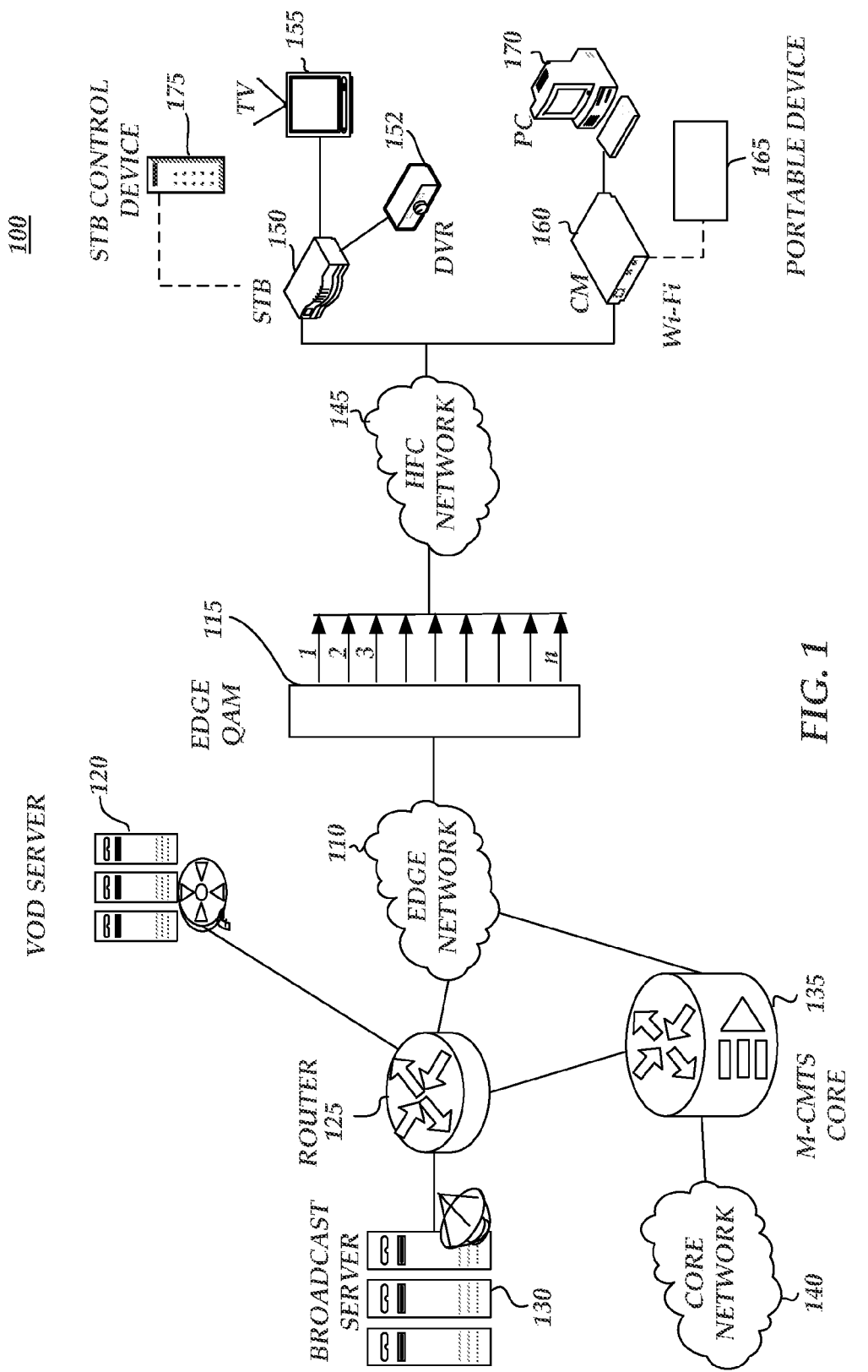
FIG. 1 is a block diagram of an operating environment including a content delivery system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Consistent with embodiments of the invention, a user may create a client-side scheduled playlist and then execute the playlist. A user can pull up and edit a playlist. The user, through a media guide for example, may schedule to watch a channel, even if it is a switched channel, in advance. For example, the user may schedule to have ABC News turn-on at: 5:30 AM so that they can wake up to the news. One benefit of implementing this feature is that if the channel is switched, the required commands can be sent to ensure that ABC News is available. Embodiments of the invention may also include the ability to control a television through a switched power outlet by commands sent over a link to the television via 1394, HDMI, or similar interface. Furthermore, the user may set up a schedule of viewing. This may be useful, for example, for a waiting room environment or commercial establishment, where the desired viewing content may change over time (e.g. ESPN until the game comes on the local channel).

FIG. 1 is a block diagram of an example content delivery system 100. Consistent with embodiments of the present invention, system 100 may comprise an edge network 110, an edge quadrature amplitude modulation (QAM) device 115, a video-on-demand (VOD) server 120, a router 125, a broadcast server 130, a modular cable modem termination system (M-CMTS) core 135, and a core network 140. In addition, system 100 may comprise, a hybrid fiber-coax (HFC) network 145, a set-top-box (STB) 150, a digital video recorder (DVR) 152, a television (TV) 155, a cable modem (CM) 160, a portable device 165, a personal computer (PC) 170, and a STB control device 175.

Edge network 110 may comprise, a network providing, for example, full-duplex, two-way broadband services including broadband video and audio, cable television services, or telecommunications services. Edge network 110 may provide data by utilizing network data formats including, for example, i) Internet Protocol (IP); ii) Ethernet; iii) digital subscriber line (DSL); iv) asynchronous transfer mode (ATM); and v) virtual private network (VPN). Edge network 110 may utilize managed network services. Edge network 110 may comprise various components including, for example, i) servers; ii) switches; iii) routers; iv) gateways; v) hubs; vi) fiber optic cable; vii) copper cable; and viii) terminations. The aforementioned are examples and edge network 110 may comprise other configurations for broadband service delivery and data switching over system 100.

Edge QAM 115 may provide modulation for various encoding formats (e.g. for data, audio, and video) and may distribute the signal down multiple broadband channels. Edge QAM 115 may modulate signals in, for example, multi-channel quadrature amplitude modulation. Edge QAM 115 may support broadcast and narrowcast with multi-program transport stream (MPTS) pass-through and single-program transport stream (SPTS) to MPTS multiplexing. Edge QAM 115 may meet data-over-cable service interface specification (DOCSIS) and downstream radio frequency interface (DRFI) performance specifications. Furthermore, edge QAM 115 may provide video over Internet Protocol and moving pictures expert group (MPEG) transport simultaneously. Edge QAM 115 may provide various data switching functions and enable two-way, full-duplex communication within the broadband network. Edge QAM 115 may modulate and distribute multimedia services including, for example, i) a broadcast multi-media service; ii) a high-definition multimedia service; iii) a digital television multimedia service; iv) an analog multimedia service; v) a VOD service; vi) a streaming video service; vii) a multimedia messaging service; viii) a voice-over-internet protocol service (VoIP); ix) an interactive multimedia service; and x) an e-mail service. The aforementioned are examples and edge QAM 115 may comprise other configurations for different broadband and data services.

VOD server 120 may perform processes for providing video entertainment on-demand. VOD server 120 may take MPEG compressed video off a hard disk or a networked service, format it into MPEG-TS packets inside a user datagram protocol (UDP) packet, and send it into edge network 110. Edge QAM 115 may receive the UDP packets, where Internet Protocol (IP) encapsulation may be removed. The MPEG packets may be forwarded down one QAM channel on edge QAM 115 and onto the HFC network 145.

Broadcast server 130 may perform processes for providing broadcast services. Broadcast server 130 may use a broadcast signal and a narrowcast signal to deliver broadcast services to a broadcast system. Broadcast server 130 may receive live or stored video, audio, and/or data from, for example, i) fiber optic input, ii) wireless input, iii) recorded tape, iv) recorded digital video disc, or v) satellite input. Broadcast server 130 may utilize digital signal formats and analog signal formats. Furthermore, broadcast server 130 may comprise a specialized receiver and data switching equipment for broadcast distribution. In addition, broadcast server 130 may provide broadband multimedia services including, for example, i) the broadcast multi-media service; ii) the high-definition multimedia service; iii) the digital television multimedia service; iv) the analog multimedia service; v) the VOD service; vi) the streaming video service; vii) the multimedia messaging service; viii) the Voice over Internet Protocol (VoIP) service; ix) the interactive multimedia service; and x) the e-mail service. The aforementioned are examples and broadcast server 130 may comprise other components and systems for providing broadcast services in system 100.

M-CMTS core 135 may receive IP datagrams from core network 140. M-CMTS core 135 may then forward these IP datagrams to either a single QAM channel within edge QAM 115 with traditional DOCSIS encapsulation, or may forward the IP datagrams to multiple QAM channels within edge QAM 115, for example, using DOCSIS channel bonding. M-CMTS core 135 may support DOCSIS features and end-to-end IP within a Next Generation Network Architecture (NGNA), for example.

Core network 140 may comprise any data or broadband network that may provide data and services to edge network 110, router 125, broadcast server 130, or M-CMTS core 135. For example, core network 140 may comprise the Internet. In addition, core network 140 may comprise various components including, for example, i) servers; ii) switches; iii) routers; iv) gateways; v) hubs; vi) fiber optic cable; vii) copper cable; and viii) terminations. The aforementioned are examples and core network 140 may comprise other components and may supply other services using various other formats.

HFC network 145 may comprise a communications network (e.g. a cable TV network) that uses optical fiber, coaxial cable, or an optical fiber coaxial cable combination. Fiber in HFC network 120 may provide a backbone for broadband services. Coaxial cable may connect end users in HFC network 120 to the backbone. Such networks may use, for example, matching DOCSIS cable modems at a head end and at an end user's premises. Such a configuration may provide bi-directional paths and Internet access.

STB 150 may comprise a single component or a multi-component system for receiving broadband services. STB 150 may comprise a service consumer system combining several components including, for example, a set top box, cable modem 160, a network interface unit, a residential gateway, a terminal unit, a scrambler/descrambler, a digital storage media unit, an input/output port, a display device, a keyboard, and a mouse. STB 150 may encode and decode digital and analog signals, and provide interface capability for other components. STB 150 may utilize various operating systems and other software components. The end user's premises may contain STB 150. STB 150 may include all the functionality provided by a cable modem, such as CM 160, in one component and attach to TV 155, for example.

DVR 152 may be used in conjunction with STB 150. DVR 152 may record video in a digital format to a disk drive, USB flash drive, memory card, or other memory medium within DVR 152. STB 150 may include all the functionality provided by a digital video recorder, such as DVR 152, in one component and attach to TV 155, for example.

TV 155 may comprise an end use device for displaying delivered broadband services. TV 155 may comprise, for example, a television, a high definition television (HDTV), a liquid crystal display unit (LCD), a video projection unit, or PC 170. The aforementioned are examples and TV 155 may comprise other display devices for delivered broadband services.

CM 160 may comprise, for example, a cable modem, a network server, a wireless fidelity data switch, or an Ethernet switch. CM 160 may provide data services to the user by accessing DOCSIS services from system 100. CM 160 may provide Internet access, video, or telephone services. The aforementioned are examples and CM 160 may comprise other data delivery devices.

Portable device 165 or PC 170 may comprise, for example, any personal computer, network switch, wireless switch, network hub, server, personal digital assistant, mobile telephone, mobile device, notebook computer, tablet computing device, and home computing device. Portable device 165 or PC 170 may serve as user devices for data access from system 100. Portable device 165 and PC 170 may transmit and receive data and services from system 100. Portable device 165 or PC 170 may record video in a digital format to a disk drive, USB flash drive, memory card, or other memory medium within or attached to portable device 165 or PC 170.

STB control device 175 may comprise any input and output device for interfacing with STB 150 or TV 155. For example, STB control device 175 may be a remote control for using STB 150. STB control device 175, after proper programming, may interface with STB 150.

Embodiments consistent with the invention may comprise a system for providing scheduling. The system may comprise memory storage and a processing unit coupled to the memory storage. The processing unit may be operative to displaying a media guide and receive a plurality of asset selection input data respectively corresponding to a plurality of assets selected from the displayed media guide. The processing unit may be further operative to store the plurality of asset selection input data in a playlist database and to execute the playlist database.

Figure 2:
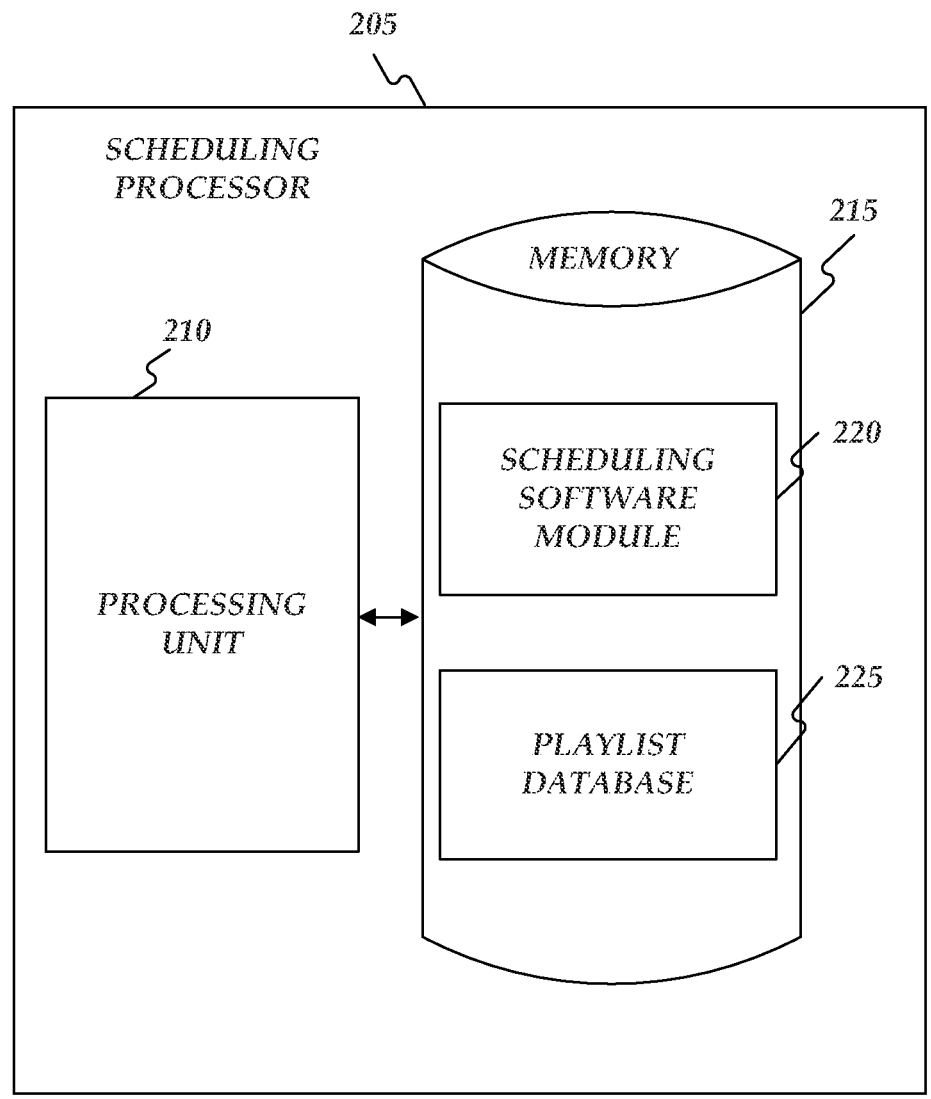
FIG. 2 is a block diagram of the scheduling processor.

Consistent with embodiments of the present invention, the aforementioned memory, processing unit, and other components may be implemented in a content delivery system, such as system 100 of FIG. 1. Any suitable combination of hardware, software, and/or firmware may be used to implement the memory, processing unit, and other components. By way of example, the memory, processing unit, and other components may be implemented with a scheduling processor 205 (as shown in FIG. 2) that may be implemented within, but not limited to, STB 150, DVR 152, TV 155, CM 160, PC 170, or portable device 165, in combination with system 100. The aforementioned system and processors are examples and other systems and processors may comprise the aforementioned memory, processing unit, and other components, consistent with embodiments of the present invention.

FIG. 2 shows scheduling processor 205. As shown in FIG. 2, scheduling processor 205 may include a processing unit 210 and a memory unit 215. Memory 215 may include a scheduling software module 220 and a playlist database 225. While executing on processing unit 210, scheduling software module 220 may perform processes for providing scheduling, in conjunction with, for example, one or more stages included in method 300 described below with respect to FIG. 3. Furthermore, scheduling software module 220 and playlist database 225 may be executed on or reside in any element shown in FIG. 1. Moreover, any one or more of the stages included in method 300 may be performed on any element shown in FIG. 1 including, but not limited to, STB 150, DVR 152, TV 155, CM 160, PC 170, or portable device 165.

Scheduling processor 205 ("the processor") may be implemented using a STB, a DVR, a CM, a mobile device, a personal computer, a network computer, a mainframe, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Figure 3:
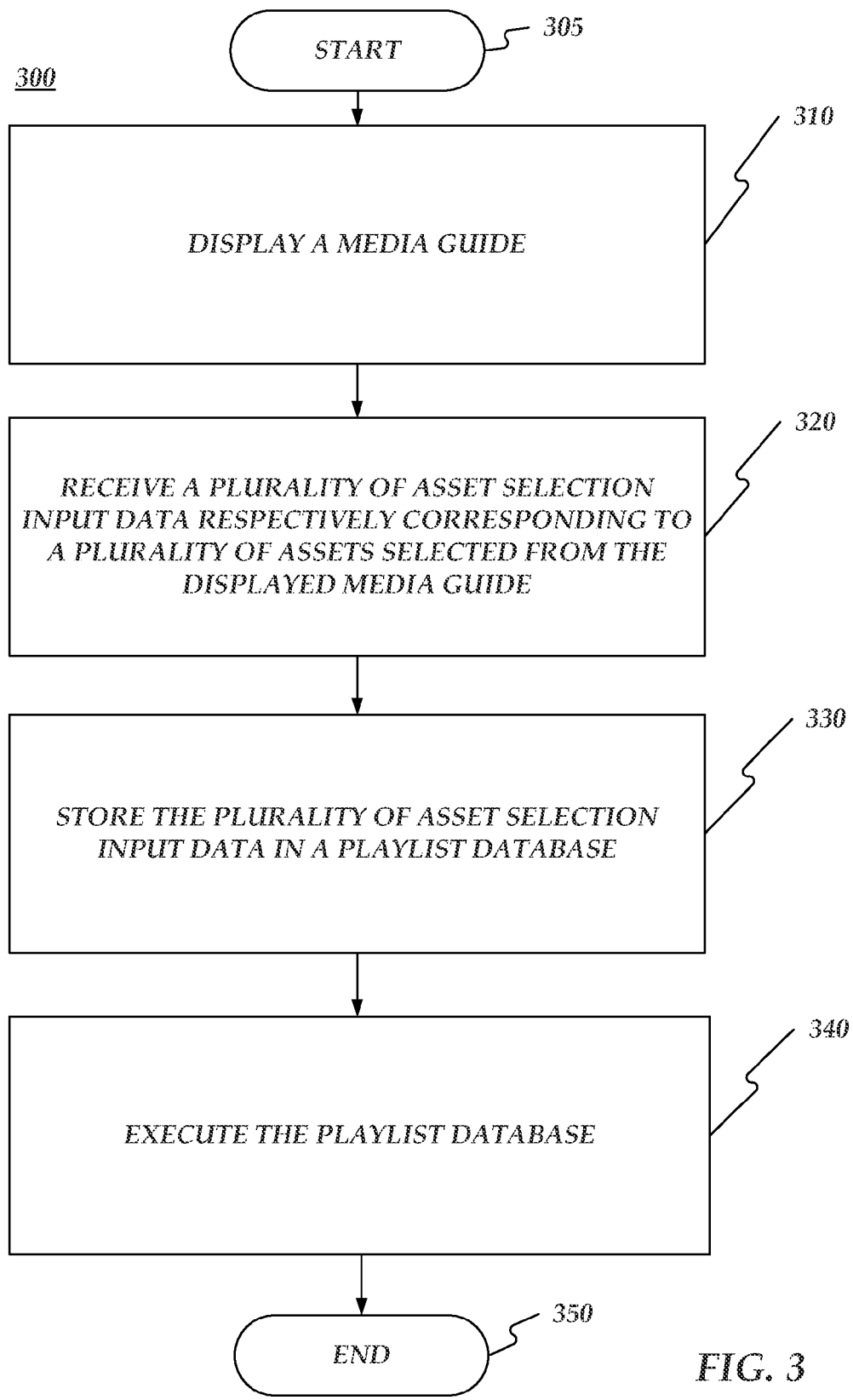
FIG. 3 is a flow chart of a method for providing scheduling.

FIG. 3 is a flow chart setting forth the general stages involved in a method 300 consistent with an embodiment of the invention for providing scheduling. Method 300 may be implemented using, for example, scheduling processor 205 that may be embodied by, for example, any one or more of STB 150, DVR 152, TV 155, CM 160, PC 170, portable device 165, or any other element in system 100. Any one or more of the stages included in method 300 may be performed on any one or more of the element shown in FIG. 1 including, but not limited to, STB 150, DVR 152, TV 155, CM 160, PC 170, or portable device 165. Ways to implement the stages of method 300 will be described in greater detail below.

Method 300 may begin at starting block 305 and proceed to stage 310 where scheduling processor 205 may display a media guide, for example, on TV 155, portable device 165, or PC 170. The media guide may provide the user with continuously updated menus displaying scheduling information for current and upcoming programming. The media guide may allow the user to navigate scheduling information menus interactively, selecting and discovering programming by time, title, station, or genre using an input device such as a keypad on portable device 165, the computer keyboard on PC 170, or STB control device 175. The media guide's interactive menus may be generated entirely within local receiving or display equipment (e.g. STB 150, DVR 152, TV 155, CM 160, PC 170, or portable device 165) using raw scheduling data sent by, for example, individual broadcast stations or centralized scheduling information providers via system 100. The media guide may provide information covering the next 7 or 14 days, for example. The media guide may display assets that are available to the user such as, but not limited to, linear television programs (e.g. from broadcast server 130), on-demand programming (e.g. from VOD server 120), or programs recorded on a digital video (e.g. from DVR 152.)

From stage 310, where scheduling processor 205 displays the media guide, method 300 may advance to stage 320 where scheduling processor 205 may receive a plurality of asset selection input data respectively corresponding to a plurality of assets selected from the displayed media guide. The plurality of asset selection input data may be received in response to the user making selections of assets from the media guide. The selected assets may comprise, but are not limited to, linear television programs, on-demand programming, or programs recorded on a digital video recorder. When the selected asset comprises a linear television program, the corresponding asset selection input data may indicate any one or more of a linear television channel, a start time, an end time, or a duration for the selected asset.

When the selected asset comprises an on-demand asset comprising a serial asset (i.e. a series of episodes), the user may select serial play causing the asset selection input data to indicate serial play or random play for the series of episodes. When serial play is selected, upon subsequent play of the playlist, subsequent episodes in the series of episodes are played in order. When random play is selected, upon subsequent play of the playlist, subsequent episodes in the series of episodes are played randomly.

Furthermore, when the user selects assets for the playlist, the user may indicate a volume level or closed captioning that may be included in asset selection input data corresponding to the asset. For example, the user may believe that a particular asset or particular channel is normally played at a volume level that is higher or lower that the user prefers. Consequently, the user may reflect adjustments to the volume in the asset selection input data corresponding to the asset. Similarly, the user may reflect closed captioning features in the asset selection input data corresponding to the asset.

From the aforementioned displayed media guide, the user may select assets that the user desires to place in a playlist. The user may select the assets for the playlist using, for example, the input device such as the keypad on portable device 165, the computer keyboard on PC 170, or STB control device 175. For example, the user may select first for the playlist CNN News from 6:00 PM to 7:00 PM from linear television. Then the user may select a linear television series on NBC for the playlist between 7:00 PM and 7:30 PM. Next for the playlist, the user may select an on-demand series to start at 7:30 PM. The user may have selected random play for the on-demand series thus random episodes of the on-demand series may be played each time the playlist is executed. The user may further indicate in the play list that this playlist is to be a "scheduled" playlist and is to be executed each week night at which time scheduling processor 205 may turn on, for example, TV 155 and execute the playlist.

The aforementioned playlist is an example of a playlist that may be tied to certain set time and/or certain days of the week (e.g. a scheduled playlist.) Embodiments of the invention may also include, for example, "generic" playlists that are not tied to certain times or days and may be executed as initiated by the user. For example, the user may select first for the playlist an asset from DVR 152. Then the user may select a linear television channel to be played for a predetermined amount of time. Next for the playlist, the user may select an on-demand series to be played at the conclusion of the aforementioned predetermined amount of time. The user may have selected serial play for the on-demand series thus episodes of the on-demand series may be played in series each time the playlist is executed. The user may initiate this playlist at any time. For example, this playlist may be a playlist that may be a playlist for making dinner or for a child's bedtime routine.

Once scheduling processor 205 receives the plurality of asset selection input data in stage 320, method 300 may continue to stage 330 where scheduling processor 205 may store the plurality of asset selection input data in playlist database 225. For example, using the input device such as a keypad on portable device 165, the computer keyboard on PC 170, or STB control device 175, the user may create a playlist.

Scheduling processor 205 may store playlist database 225 in memory 215. The user may indicate that the playlist is a "scheduled" playlist and that the playlist should execute at certain set times and/or certain days of the week. Or the user may indicate that the playlist is a "generic" playlist, thus the playlist may be executed by scheduling processor 205 at the behest of the user. While "scheduled" and "generic" playlists are examples, other types of playlists may be used. Embodiments of the invention are not limited to "scheduled" or "generic" playlists.

After scheduling processor 205 stores the plurality of asset selection input data in stage 330, method 300 may proceed to stage 340 where scheduling processor 205 may execute playlist database 225. In the case of "generic" playlists, scheduling processor 205 may execute playlist database 225 in response to a user initiated input from the input device. In the case of "scheduled" playlists, scheduling processor 205 may executes playlist database 225 in response to a time set by the playlist.

When the selected asset comprises an on-demand asset comprising a serial asset (i.e. a series of episodes), the asset selection input data may indicate serial play or random play for the series of episodes. When serial play is indicated, upon subsequent play of the playlist by scheduling processor 205, subsequent episodes in the series of episodes may be played in order. When random play is indicated, upon subsequent play of the playlist, subsequent episodes in the series of episodes may be played randomly by scheduling processor 205.

When executing playlist database 225, scheduling processor 205 may read the plurality of asset selection input data and play the plurality of assets according to the read plurality of asset selection input data. The plurality of assets may be played on a display device comprise, for example, TV 155, portable device 165, or PC 170. When executing the playlist, scheduling processor 205 may turn on the display device at the onset of executing the playlist. Likewise, scheduling processor 205 may turn off the display device at the completion of the playlist. Just prior to executing the playlist, scheduling processor 205 may display a screen on the display device letting any viewer know that a playlist is about to be executed and that a PIN number may be entered if the view wishes to override the playing of the playlist. Furthermore, at anytime during the execution of the play list, the user may initiate an override input from the input device and enter a pin number to override and stop the execution of the playlist.

In addition, scheduling processor 205 may adjust a volume level of the display device on which the plurality of assets are being played in accordance to asset selection input data for each of the plurality of assets being played. Furthermore, when executing the playlist database scheduling processor 205 may disable trick play while playing the plurality of assets. In this way the playlist's execution may not be interfered with while the playlist is being executed. Once scheduling processor 205 executes playlist database 225 in stage 340, method 300 may then end at stage 350.

Consistent with other embodiments of the invention, the user can pull up and edit an existing playlist. For example, the user may use an input device to pull the existing play list up, for example, on portable device 165, PC 170, or TV 155. The input device may comprise, but is not limited to, the keypad on portable device 165, the computer keyboard on PC 170, or STB control device 175. The existing playlist may comprise CNN News from 6:00 PM to 7:00 PM from linear television, a linear television series on CBS for the playlist between 7:00 PM and 7:30 PM, and an on-demand series to start at 7:30 PM. Consistent with embodiments of the invention, the user may use the input device to edit the existing play list. The user may use the input device to cause the existing playlist to comprise Fox News instead of CNN from 6:00 PM to 7:00 PM and a linear television series on ABC rather than CBS between 7:00 PM and 7:30 PM. Furthermore, the user may add additional content to play after the end of the on-demand series that starts at 7:30 PM in the existing playlist. The aforementioned is an example, and the user may edit the exiting playlist in any way.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing scheduling, the method comprising:
   displaying a media guide;
   receiving a plurality of asset selection input data respectively corresponding to a plurality of assets selected from the displayed media guide;
   receiving an indication from a user classifying each of the selected plurality of assets into a generic playlist and a scheduled playlist, wherein receiving the indication classifying the plurality of assets into the scheduled playlist further comprises:
      receiving a schedule of execution of the scheduled playlist,
      receiving a time of execution and a duration of execution from the time of execution for each of the plurality of assets selected into the scheduled playlist, and
      receiving, when a selected asset is a video on demand (VOD) asset comprising a serial asset, an indication of at least one of the following: a serial play and a random play during the duration of execution;
   storing the plurality of asset selection input data in a playlist database;
   executing the plurality of asset selection input data from the playlist database, wherein plurality of asset selection input data comprises:
      reading the plurality of asset selection input data from the playlist database,
      executing the plurality of asset selection input data read from the generic playlist in response to an input from an user for playing the generic play list, and
      executing the plurality of asset selection input data read from the scheduled playlist automatically at the time of execution indicated by the user, wherein executing the scheduled playlists further comprises displaying at least one of the plurality of assets from the scheduled playlist based on a time associated with the received schedule of execution at a display device;
   wherein executing the plurality of asset selection input data further comprises:
      displaying, at an onset of the scheduled playlist, a notification that the scheduled playlist is about to be executed and to enter a personal identification (PIN) to override the execution of the scheduled playlist, and
      disabling a trick mode during the execution of the plurality asset selection input data.

2. The method of clam 1, wherein receiving the plurality of asset selection input data comprises receiving the plurality of asset selection input data wherein at least one of the plurality of asset selection input data indicates, for a one of the plurality of assets corresponding to the at least one of the plurality of asset selection input data, a linear television channel, a start time, and an end time.

3. The method of clam 1, wherein receiving the plurality of asset selection input data comprises receiving the plurality of asset selection input data wherein at least one of the plurality of asset selection input data indicates, for a one of the plurality of assets corresponding to the at least one of the plurality of asset selection input data, a linear television channel, a start time, and a duration time.

4. The method of clam 1, wherein receiving the plurality of asset selection input data comprises receiving the plurality of asset selection input data wherein at least one of the plurality of asset selection input data indicates, for a one of the plurality of assets corresponding to the at least one of the plurality of asset selection input data, a program recorded on a digital video recorder.

5. The method of clam 1, wherein receiving the plurality of asset selection input data comprises receiving the plurality of asset selection input data wherein at least one of the plurality of asset selection input data indicates, for a one of the plurality of assets corresponding to the at least one of the plurality of asset selection input data, a volume level.

6. The method of clam 1, wherein receiving the plurality of asset selection input data comprises receiving the plurality of asset selection input data on one of the following: a set top box, a mobile device, and a computer.

7. The method of clam 1, wherein storing the plurality of asset selection
   input data in the playlist database comprises storing the plurality of asset selection input data in the playlist database wherein the playlist database is configured to be executed at a time indicated by one of the following: a user and by the playlist database.

8. The method of claim 1, wherein executing the scheduled playlist further comprises displaying, in response to selection of random play for the serial asset, a randomly selected episode from the serial asset.

9. The method of claim 1, wherein receiving the plurality of asset selection further comprising receiving an indication of displaying a caption.

10. The method of claim 1, wherein receiving the plurality of asset selection comprises receiving the plurality of asset selection from a portable computing device.

11. A method for providing scheduling, the method comprising:
   receiving a playlist database comprising a plurality of asset selection input data respectively corresponding to a plurality of assets, wherein receiving the playlist database comprising the plurality of asset selection input data further comprises receiving an indication from a user classifying each of the plurality of assets into a generic playlist and a scheduled playlist, wherein receiving the indication classifying the plurality of assets into the scheduled playlist further comprises:
      receiving a schedule of execution of the scheduled playlist,
      receiving a time of execution and a duration of execution from the time of execution for each of the plurality of assets selected into the scheduled playlist, and
      receiving, when a selected asset is a video on demand (VOD) asset comprising a serial asset, an indication of at least one of the following: a serial play and a random play during the duration of execution;

executing the plurality of asset selection input data from the playlist database, wherein executing the the plurality of asset selection input data from comprises:
reading the plurality of asset selection input data from the playlist database,
executing the plurality of assets read from the generic playlist in response to an input from an user for playing the generic play list, and
reading the time of execution of each of the plurality of assets in the scheduled playlist,
displaying at least one of the plurality of assets from the scheduled playlist at the execution time, and
executing the plurality of asset selection input data read from the scheduled playlist, wherein the scheduled playlist is executed automatically at a predetermined time, wherein displaying the at least one of the plurality of assets comprises:
displaying, at an onset of the scheduled playlist, a notification that the scheduled playlist is about to be executed and to enter a person identification (PIN) to override the execution of the scheduled playlist, and
disabling a trick mode during the execution of the plurality asset selection input data.

12. The method of clam 11, wherein executing the playlist database comprises turning on a display device prior to playing the plurality of assets.

13. The method of clam 11, wherein playing the plurality of assets comprises adjusting a volume level of a display device on which the plurality of assets are being played in accordance to asset selection input data for each of the plurality of assets being played.

14. The method of clam 11, wherein executing the playlist database comprises executing the playlist database from a set top box.

15. The method of clam 11, wherein executing the playlist database comprises executing the playlist database at a time concurrent with the reception of the user initiated input.

16. The method of clam 11, wherein executing the playlist database comprises executing the playlist database at a time indicated by a first one of the plurality of asset selection input data.

17. The method of clam 11, wherein playing the plurality of assets according to the read plurality of asset selection input data comprises playing a random episode from a series of episodes when the read plurality of asset selection input data indicates the random play.

18. The method of clam 11, wherein playing the plurality of assets according to the read plurality of asset selection input data comprises playing a next episode from a series of episodes when the read plurality of asset selection input data indicates the serial play.

19. The method of claim 11, wherein receiving the plurality of asset selection comprises receiving the plurality of asset selection from a portable computing device.

20. A system for providing scheduling, the system comprising:
a memory storage; and
a processing unit coupled to the memory storage, wherein the processing unit is operative to:
receive a playlist database comprising a plurality of asset selection input data respectively corresponding to a plurality of assets, wherein receiving the playlist database comprising the plurality of asset selection input data further comprises receiving an indication from a user classifying each of the plurality of assets into a generic playlist and a scheduled playlist, wherein the processing unit being configure to receive the indication classifying the plurality of assets into the scheduled playlist comprises the processing unit further configured to:
receive a schedule of execution of the scheduled playlist,
receive a time of execution and a duration of execution from the time of execution for each of the plurality of assets classified into the scheduled playlist, and
receive, when a selected asset is a video on demand (VOD) asset comprising a serial asset, an indication of at least one of the following: a serial play and a random play during the duration of execution;
store the a plurality of asset selection input data in a playlist database;
execute the playlist database, wherein executing the playlist comprises,
read the plurality of asset selection input data from the playlist database,
execute the plurality of assets read from the generic playlist in response to an input from an user for playing the generic play list, and
execute the plurality of assets read from the schedules playlist automatically at the time of execution of the plurality of assets in the scheduled playlist indicated by the user; and
play a first asset of the plurality of assets based on the time of execution of the plurality of asset selection input data, wherein the processing unit being operative to play the first asset comprises the processing unit being operative to tune to a first channel indicated by the first one of the plurality of asset selection input data and staying tuned to the first channel for a time period indicated by the first one of the plurality of asset selection input data, wherein the processing unit being configured to display the first asset of the plurality of assets comprises the processing unit further configured to:
display, at an onset of the scheduled playlist, a notification that the scheduled playlist is about to be executed and to enter a person identification (PIN) to override the execution of the scheduled playlist; and
disable a trick mode during the execution of the plurality asset selection input data.

* * * * *